United States Patent [19]

Christiansen et al.

[11] 4,336,945
[45] Jun. 29, 1982

[54] SINUOUS SEAL WITH AUXILIARY EXCLUDER LIPS

[75] Inventors: Keith W. Christiansen, Fox River Grove; Anthony W. Vering, Arlington Heights, both of Ill.

[73] Assignee: CR Industries, Elgin, Ill.

[21] Appl. No.: 779,259

[22] Filed: Mar. 18, 1977

[51] Int. Cl.³ .............................................. F16J 15/32
[52] U.S. Cl. ..................................... 277/153; 277/134
[58] Field of Search ................ 277/133, 134, 152, 153

[56] References Cited

U.S. PATENT DOCUMENTS

| | | | |
|---|---|---|---|
| 2,840,396 | 6/1958 | Hennessy | 277/237 A |
| 3,306,683 | 2/1967 | Deuring | 277/153 |
| 3,511,512 | 5/1970 | Wheelock | 277/153 |
| 3,672,690 | 6/1972 | Berens | 277/134 |
| 3,929,340 | 12/1975 | Peisker | 277/134 |
| 3,941,396 | 3/1976 | Bailey et al. | 277/134 |

Primary Examiner—Robert I. Smith
Attorney, Agent, or Firm—James T. FitzGibbon

[57] ABSTRACT

A seal assembly for creating a fluid seal between first and second, relatively movable elements, at least one of which is arranged for rotation about a given axis. The seal has a mounting portion thereof adapted to be fixedly associated in use with said first element, a dirt exclusion portion and an oil retention portion. The dirt exclusion portion has a plurality of annular excluder lips, and the excluder lips, as manufactured, extend radially inwardly and are spaced axially apart from each other. The lips also have an inside diameter substantially smaller than that of said second relatively movable element, and the excluder lips, in position of use, contact and lie along the second element, as installed, the lips are flexed so that the inner portions thereof extend radially inwardly as well as axially away from the region to be sealed. The oil retention portion comprising a generally annular, flexible primary hydrodynamic sealing lip portion disposed, in use, in a generally facing relation to the second element and defined by at least partially converging first and second, at least partially axially undulating frustoconical lip surfaces meeting each other along an axially undulating seal band area formed at the convergence of the undulating lip surfaces.

2 Claims, 3 Drawing Figures

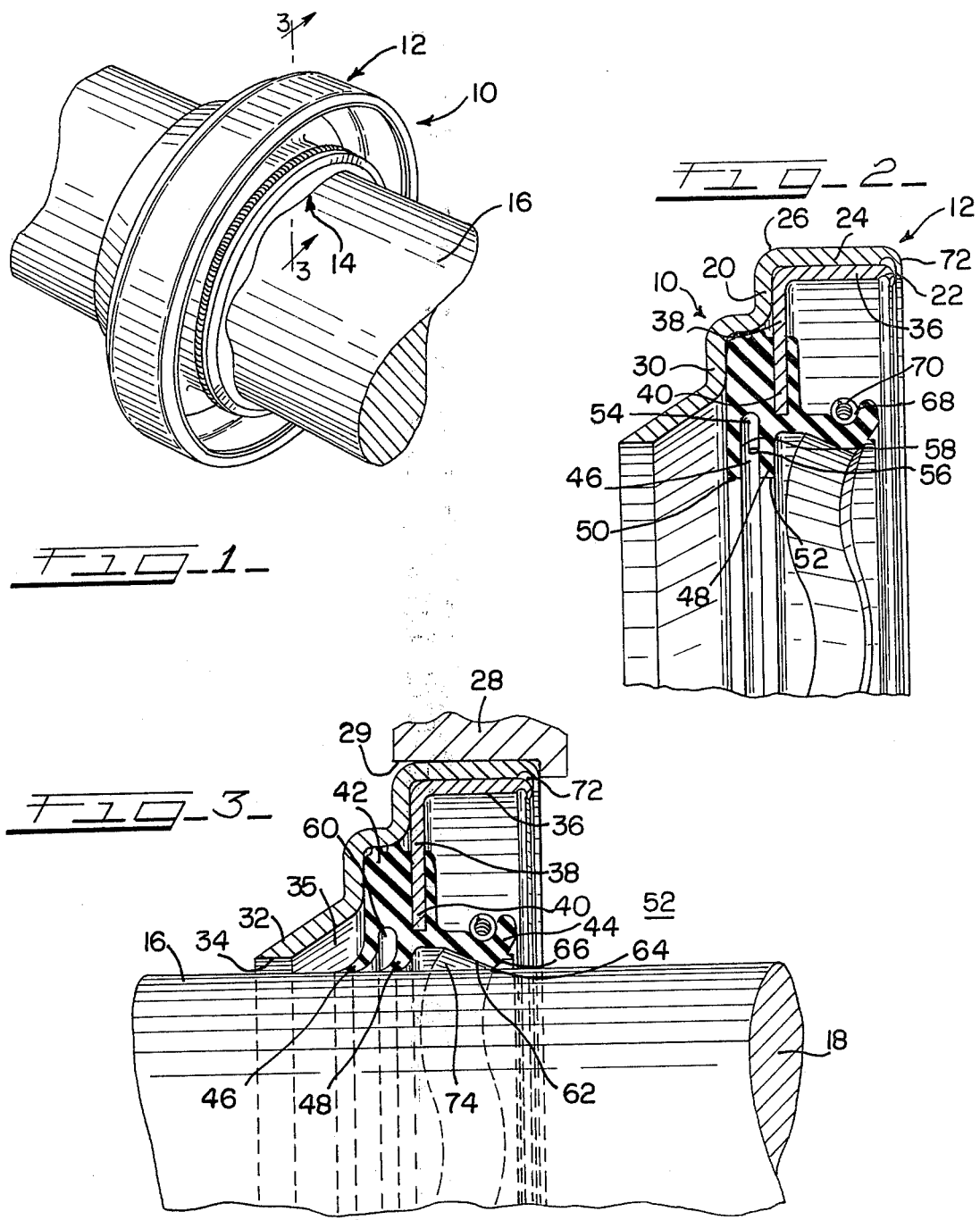

SINUOUS SEAL WITH AUXILIARY EXCLUDER LIPS

BACKGROUND OF THE INVENTION

The present invention relates generally to oil seals, and more particularly, to improved oil seals which combine excellent sealing action, a certain oil return pumping or hydrodynamic capability, reduced temperature running, longer wear, and freedom from damage occasioned by use in relatively severe exterior environments.

Oil seals made according to the present invention are an improvement to the type of seal described and claimed in U.S. Pat. No. 3,929,340, issued Dec. 30, 1975.

Seals made according to the above-identified patent provided a marked increase in predictable seal life, and combined reduced temperature running with a pumping or hydrodynamic action characterized by the ability to return to the sealed region small amounts of oil which might otherwise have collected just outside the sealed region and which might, therefore, create a problem of leakage. Seals of this type are also advantageous in that, within normal limits, although providing good pumping action, they do not provide a pumping action which is either too great, or an action which is too small to be ineffective. At the same time, seals of this type lack external projections such as ribs or vanes on the exterior or air side of the seal band, and, accordingly, these improved seals tend naturally to ingest less dirt and dust than do other types of known hydrodynamic seals.

Inasmuch as any hydrodynamic or pumping seal is capable of pumping oil tending to escape between the seal band and the shaft or the like, such seals inherently may also undesirably return a certain amount of dirt or dust to the sealed region.

Accordingly, a very desirable seal would be one which would ingest little, if any, dust or dirt in normal use, but which would still retain the pumping capability and the cool running characteristics associated with a sinuous seal band type primary lip configuration. A seal of this type would be very desirable if effective means were provided for keeping dust and dirt, particularly large quantities thereof, from the vicinity of the primary seal band.

In this connection, seals of the type referred to in U.S. Pat. No. 3,929,340, have been produced both with and without a so-called dirt lip or excluder lip. Seals utilizing lips of this kind normally do so for the purpose of keeping moderate amounts of dust from the primary lip region, however, seals of this kind have not proved entirely capable of excluding physically large or heavy amounts of dirt, mud or the like from the region adjacent the primary seal band.

This is because, among other reasons, the size and shape of the ordinary dust lip associated with such a seal is mall and flexible, and will rapidly wear in use so as to permit a measurable clearance between the shaft or other sealed member.

Even where dust lips have been provided which have been partily or even moderately successful, such lips tend to have the inherent drawback of dry running, that is, operating in the absence of lubricant. This, in turn, causes elevated temperatures in the vicinity of the dust lip and tends to reduce the flexibility or even cause embrittlement.

Accordingly, the addition of an ordinary dust lip of the known type to a seal having a sinuous primary lip, constitutes a certain improvement over sinuous seals without dirt lips; however, dirt lips or seals of this sort have not proved successful in overcoming the problems of severe use, that is, use in sealing shafts in environments such as those environments utilizing farm equipment and the like, wherein the seal itself is exposed to the atmosphere or environment and is not largely protected by surrounding mechanisms such as large flanges, bell housings, vibration dampers, slinger members, or other mechanical parts.

In view of the foregoing limitations of some prior art seals, and in view of the desirable characteristics which should be embodied in an improved sinuous seal for external applications, it is an object of the present invention to provide an improved oil seal for use in severe environments.

Another object is to provide a fluid seal which includes the advantages of sinuous lip prior art seals, and which further includes the advantages of improved dirt exclusion and adaptability to extremely dirty and dusty environments.

Still another object is to provide a fluid seal which includes both elastomeric and relatively rigid means for excluding dirt from the area between the primary sealing lip portion of the seal assembly and the innermost dirt lip.

Yet another object is to provide a seal having a plurality of dirt and dust exclusion lips which are distorted from an unstressed or as-manufactured position into a distorted position of use and in which the primary seal lip is distorted only slightly upon installation.

Another object is to provide a fluid seal which is particularly adapted for reception of a charge of grease or other viscous lubricant in the areas of the dirt lips, and which can therefor be operated under extreme conditions without generating an intentionally high temperature rise in the vicinity of the excluder lips and in the vicinity of the excluder flange of the seal casing.

A still further object is to provide an oil seal assembly which includes both inner and outer elements comprising a composite casing, and in which the outer casing unit protects an elastomeric dirt lip and serves as an excluder for large dirt particles.

The foregoing and other objects and advantages of the invention are achieved in practice by providing an oil seal having a rigid exterior casing and a dirt exclusion assembly comprising a plurality of radially extending excluder lips spaced axially apart from each other and having substantially reduced diameters with relation to a shaft to be sealed, and a primary seal lip assembly which includes first and second, axially indulating, frustoconical lip surfaces meeting each other along an axially undulating line to form a seal band area with an axially sinuous pattern.

The manner in which the foregoing and other objects and advantages are achieved in practice will become more apparent when reference is made to the following detailed description of the preferred embodiments of the invention set forth by way of example and shown in the accompanying drawings, in which the like reference numbers indicate corresponding parts throughout:

BRIEF DESCRIPTION OF THE DRAWINGS

FIG. 1 is a perspective view, with portions broken away, showing the shaft seal of the invention and showing a shaft extending through the seal in a position of use;

FIG. 2 is a vertical sectional view, with portions broken away, of the oil seal of FIG. 1, showing the seal in the as-manufactured or unstressed condition thereof; and FIG. 3 is a vertical sectional view, with portions broken away, showing the oil seal of FIGS. 1 and 2 in a stressed or installed position, and showing the relation thereof to the shaft forming member sealed by the assembly of the invention.

DESCRIPTION OF THE PREFERRED EMBODIMENTS OF THE INVENTION

Although the seal of the invention is capable of a number of uses, and the seal may be made in different forms, a description of a preferred embodiment thereof will be made in which the seal acts radially inwardly rather than outwardly, and in which the dirt excluder assembly includes a pair of elastomeric excluder lips. In the preferred form, a flange of a stiff material such as steel or the like, is also provided to cover a major portion of the dirt lips.

Referring now to the drawings in greater detail, FIG. 1 shows an oil seal, generally designated 10, made according to the invention and shown to include a casing portion generally designated 12, and an elastomeric portion lying inside the casing 12 and directed toward the radially outer surface 16 of a shaft 18 which is mounted so as to rotate within the seal assembly.

Referring now to FIGS. 2 and 3, a cross section of the seal is shown to include the casing 12, which is in turn comprised of a so-called outer cup 20, and a so-called inner cup 22. As used herein, the expressions "outer" and "inner" as applied to the cups or stampings means radially outer and inner, as applied to the seal lips, "axially inner" means toward the sealed region and "axially outer" means away from the sealed region. The outer cup 20 includes an axially extending flange 24 having an outer surface 26 adapted for reception within a counterbore 29 formed in a machine member housing 28 (FIG. 3).

A contoured, radially extending portion 30 of the outer cup 20 extends downwardly and away from the sealed region in one or more steps, and terminates in a radially inwardly, axially outwardly angled flange 32, having a radially inwardly directed annular edge 34. The edge 34 is spaced apart from the exterior surface 16 of the shaft 18 by working clearance which is sufficient to allow for any shaft-to-bore misalignment which may occur in installation of the seal, and also to accommodate any dynamic radial runout which will occur during rotation of the shaft. Inwardly of the angled flange 32 is a first interior region generally designated 35.

Referring now to the inner cup 22, this element of the seal casing 12 is shown to include an axially extending flange 36 and a radially extending flange 38. An elastomeric, seal forming annular body 42 is bonded to the inner margin 40 of the flange 38. The body 42 is functionally subdivided into a primary sealing lip portion generally designated 44 and an auxiliary sealing lip portion which includes axially outer and inner auxiliary sealing lips 46, 48.

According to the invention, the primary sealing lip 44 is distorted only slightly radially outwardly during installation, while the resilient auxiliary lips 46 and 48 are substantially distorted or flexed from the position shown in FIG. 2 to the position shown in FIG. 3.

Referring now to the auxiliary lips 46, 48 it will be seen that each lip includes a radially inwardly directed, generally axially extending annular surface 50, 52 and that the oppositely directed wall forming portions 54, 56 of the respective lips 46, 48 serve to define therebetween a second interior or inter-lip area 60. Lying axially inwardly of the lips 46, 48 is the primary sealing lip 42, which includes a frusto-conical, generally axially and radially inwardly extending surface 62 (the so-called "air" side surface) which is joined along a sinuous seal band 64 to a radially inwardly, axially outwardly extending or "oil" side surface portion 66 of the lip 42. The air and oil side surfaces 62, 66 are both frusto-conical surfaces which undulate axially, and which meet to form the undulating seal band 64. The construction of this portion of the seal is similar to that shown in U.S. Pat. No. 3,929,340 and issued Dec. 30, 1975; the seal band 64, viewed axially, is circular and does not undulate radially.

Disposed radially outwardly of the surfaces 62, 66 is an annular extending spring groove 68 which receives an annular coil spring 70, sometimes referred to as a garter spring, which serves to create a radial compressive load on the lip 42 and thus on the seal band 64.

Referring now to the use of the seal of the invention, it will be assumed that a seal of the type shown in FIG. 2 has been produced by simultaneously molding and bonding the elastomeric or seal element portion 42 to the inner margin 40 of the casing flange 38 and that the inner casing 22 has been locked in place within the outer casing 12.

Prior to installation, the inner surface of the primary seal lip 42 may be covered with a coating of oil or other medium to be sealed. In some instances, such as where the apparatus of the invention will be used in farm machinery or the like, it is desirable to dispose a mass of viscous grease within the region 35 between the flange 32 and the lip 46, as well as within the inter-lip in the area 60 lying between the two auxiliary lips 46, 48. After preparation, this seal is positioned so that the primary lip 44 extends over the end of a shaft to be sealed, and the entire seal assembly is pushed axially over the shaft, that is, to the right as shown in FIG. 3. The outer surface of the casing 24 is then pressed tightly into the counterbore or opening 29 in the machine housing 28, to locate the assembly 10 and to create an oil-tight secondary or non-rotating seal.

When the apparatus is operated, oil or like fluid in the interior region 52 is retained therein by the radial load of the seal lip 44. Any trace of amounts of oil which may tend to leak axially of the shaft are returned to the sealed region 52 by the "snow plow" or differential angle pumping mechanism resulting from the use of the sinuous seal band. The advantages of operation of this type of seal are set forth in detail in U.S. Pat. No. 3,929,340. The angled flange 32 serves to prevent large rocks, stones or pieces of earth or the like from engaging or entering the first sealed region 35. Any dust, dirt, or other abrasive material, as well as water which does gain entrance to the region 35 by passing beneath the annular surface 34 is encountered by the first auxiliary or dirt lip 46. This lip serves to exclude the major portion of dirt and dust from entering the region 60 between the lips 46, 48. This region is normally supplied with a heavy grease which provides the lubrication between the inside diameter of the lips 46, 48 and the shaft and which also entraps certain particles of dirt and dust to prevent abrasion of the shaft and the seals. Accordingly, little if any dirt is able to pass through this region 60 and beneath the second auxiliary lip seal 48.

The amounts of dirt passing beneath this second lip are so small that they can be accommodated in the area 74 between the primary lip and the auxiliary lips. As a result of the substantially complete exclusion of dirt from this area 74, any tendency which the sinuous lip would have to ingest dirt and water, along with whatever oil may have leaked from the region 52, is minimized and, in most cases, completely eliminated.

Seals made according to the present invention, in use, have proved highly effective, particularly in very dirty environments, and have enabled users to obtain the extended life and other advantages which obtain from the use of the sinuous lip seal. The combination of the sinuous lip seal with the two or more excluder lips provides a combination of exclusion and hydrodynamic sealing which was not able to be accomplished by seals of the prior art. The additional provision of a rigid excluder flange further assists the seal in carrying out its intended function.

It will thus be seen that the present invention provides a novel oil seal having a number of advantages and characteristics including those pointed out above and others which are inherent in the invention. A preferred embodiment of the invention having been described by way of illustration, it is anticipated that changes and modifications of the described oil seal will occur to those skilled in the art and that such changes and modifications may be made without departing from the spirit of the invention or the scope of the appended claims.

We claim:

1. A radially inwardly acting seal assembly for creating a fluid seal between first and second, relatively movable elements, at least one of which is arranged for rotation about a given axis, said unit having a mounting portion thereof adapted to be fixedly associated in use with said first element, a unitary elastomeric seal body comprising a dirt exclusion portion and an oil retention portion, said dirt exclusion portion having a plurality of annular excluder lips, said excluder lips, as manufactured, extending radially inwardly and being spaced axially apart from each other, said lips having an inside diameter substantially smaller than that of said second relatively movable element, said excluder lips, in position of use, contacting and lying along said second element, and being flexed thereby so that the inner portions thereof extend radially inwardly as well as axially away from the region to be sealed, said oil retention portion comprising a generally annular, flexible primary hydrodynamic sealing lip portion disposed, in use, in a generally facing relation to said second element and defined at least partially by converging first and second, at least partially axially undulating frustoconical lip surfaces meeting each other along an axially undulating seal band area formed at the convergence of said undulating lip surfaces, said seal band undulating so as to have portions thereof lying on either side of an imaginary plane lying parallel to the plane of said seal mounting portion and substantially perpendicular to said given axis of said movable member, said first lip surface at least partially facing the surface of said second element lying on the exterior of a region in which a fluid is to be sealed, and said second lip surface at least partially facing the surfaces of said second element lying on the interior of said region in which said fluid is to be sealed, the included angle between said first lip surface and the surface of said second element being less than the included angle between said second lip surface and the surface of said second element, said angles being measured as said seal is in a normally installed position of use over said second member, the seal bands of all of said lips being of substantially constant radius throughout their entire extents, said seal assembly further including as a part of said dirt exclusion portion, a protective flange affixed to said mounting portion, said protective flange extending radially inwardly and being inclined away from said region to be sealed, said protective flange having an annular inner surface closely spaced apart from said second element.

2. A seal assembly as defined in claim 1 wherein said excluder lips and said protective flange are spaced sufficiently closely apart from one another so as to be adapted to retain and hold a mass of grease between said lips, and between one of said lips and said protective flange, whereby the shaft may be lubricated by said grease in the vicinity of said lips and said flange.

* * * * *

UNITED STATES PATENT AND TRADEMARK OFFICE
CERTIFICATE OF CORRECTION

PATENT NO. : 4,336,945
DATED : June 29, 1982
INVENTOR(S) : Keith W. Christiansen et al.

It is certified that error appears in the above-identified patent and that said Letters Patent are hereby corrected as shown below:

Column 2, line 52, the word "indulating" should be --undulating--.

Signed and Sealed this

Thirtieth Day of November 1982

[SEAL]

Attest:

GERALD J. MOSSINGHOFF

Attesting Officer

Commissioner of Patents and Trademarks